United States Patent [19]
Padalino et al.

[11] Patent Number: 5,299,296
[45] Date of Patent: Mar. 29, 1994

[54] MULTI-FUNCTION MACHINE WITH INTERLEAVED JOB EXECUTION

[75] Inventors: Marco Padalino, Dallas, Tex.; Michael Moore; Thanh Nguyen, both of San Jose, Calif.

[73] Assignees: Ricoh Company, Ltd.; Ricoh Corporation, San Jose, Calif.

[21] Appl. No.: 71,929

[22] Filed: Jun. 4, 1993

Related U.S. Application Data

[63] Continuation of Ser. No. 778,001, Oct. 17, 1991.

[51] Int. Cl.$^5$ ............................................. G06F 15/00
[52] U.S. Cl. .................................... 395/112; 395/113; 395/114
[58] Field of Search ............................. 395/112-116, 395/164, 200, 109, 500; 358/404, 444, 165, 401, 401, 403; 400/70, 72, 61, 67, 69; 346/154

[56] References Cited

U.S. PATENT DOCUMENTS

| | | | |
|---|---|---|---|
| 4,696,562 | 9/1987 | Urata et al. | 395/112 |
| 4,910,607 | 3/1990 | Kitz et al. | 395/112 |
| 4,947,345 | 8/1990 | Paradise et al. | 395/112 |
| 4,992,958 | 2/1991 | Kageyama et al. | 395/114 |
| 5,050,098 | 9/1991 | Brown, III et al. | 395/114 |
| 5,164,842 | 11/1992 | Gauronski et al. | 358/444 |

Primary Examiner—Arthur G. Evans
Attorney, Agent, or Firm—Flehr, Hohbach, Test, Albritton & Herbert

[57] ABSTRACT

A multi-function machine with interleaved job execution is disclosed. The multi-function machine performs multiple functions such as printing and digital copying. Multiple users of the machine are intermittently serviced as the machine switches from printing to copying jobs and vice versa. The manner of switching is partially determined by whether the requisite set-up time for a particular job is complete. The manner of switching may also be determined by user-set priorities. In either embodiment, jobs are interleaved so as to eliminate unused time associated with the period required to set-up a job. As a result, the machine operates optimally while intermittently making progress on multiple jobs.

13 Claims, 6 Drawing Sheets

MULTI-FUNCTION MACHINE WITH INTERLEAVED JOB EXECUTION

This is a continuation of application Ser. No. 07/778,001 filed Oct. 17, 1991.

BRIEF DESCRIPTION OF THE INVENTION

The present invention relates generally to a multi-function machine which performs a number of jobs such as printing and digital copying. More particularly, the present invention relates to a multi-function machine which interleaves printing and copying jobs in an optimal manner such that the machine intermittently progresses on a number of requested jobs.

BACKGROUND OF THE INVENTION

Multi-function machines have been recently developed. These machines commonly include the capability to print a digitally formatted document which is downloaded from a host computer. As is known in the art, the print function of the multi-function machine is realized by utilizing a laser and a polygon mirror to write information on a photoreceptor. The photoreceptor is subsequently placed in contact with a piece of paper which acquires the image written on the photoreceptor. Prior to this print function, a set-up time is required for rasterizing the document downloaded from the host computer. The machine is otherwise idle during this set-up time.

Prior art multi-function machines also commonly include the capability to digitally copy a document. As is known in the art, the digital copying aspect of these machines is realized through a Charge Coupled Device (CCD) which acquires a digital data representation of an image. The digital image data is then conveyed to the printer portion of the machine which yields a printed document. Typically, for large copying jobs, a set-up time is required as an automatic document feed moves documents into a proper position for scanning. The automatic document feed is a mechanical device which is relatively slow. As a result, the set-up time associated with the document feed reduces the efficiency of the multi-function machine.

Prior art multi-function machines may also include a capability to send and receive facsimile documents. A received facsimile document is usually printed in accordance with the printer aspect of the multi-function machine. A facsimile document to be sent is typically scanned and encoded by the CCD element of the multi-function machine.

Multi-function machines are commonly utilized by a number of users. For instance, a multi-function machine may be directly coupled to a number of computers or may be coupled to a local area network. The users of the computers may simultaneously initiate requests to print documents. At the same time, an individual may be standing at the machine and request that a copying job be performed. Moreover, an incoming facsimile job may simultaneously require the printer function of the machine.

Thus, it is readily obvious that contention problems may arise with a multi-function machine. A user of a multi-function machine naturally desires that progress be made on his or her job at all available times.

OBJECTS AND SUMMARY OF THE INVENTION

Thus, it is a general object of the present invention to provide a multi-function machine which reduces job contention by providing interleaved job execution.

It is a related object of the present invention to provide a method and apparatus for utilizing the time associated with setting-up a job to make progress on another pending job.

It is related object of the present invention to provide a method and apparatus for alleviating job contention by intermittently servicing a number of pending jobs.

These and other objects are achieved by a multi-function machine with interleaved job execution. The multi-function machine performs multiple functions such as printing and digital copying. Multiple users of the machine are intermittently serviced as the machine switches from printing to copying jobs and vice versa. The manner of switching is partially determined by whether the requisite set-up time for a particular job is complete. The manner of switching may also be determined by user-set priorities. In either embodiment, jobs are interleaved so as to eliminate unused time associated with the period required to set-up a job. As a result, the machine operates optimally while intermittently making progress on multiple jobs.

BRIEF DESCRIPTION OF THE DRAWINGS

For a better understanding of the nature and objects of the invention, reference should be had to the following detailed description taken in conjunction with the accompanying drawings, in which.

Like reference numerals refer to corresponding parts throughout the several views of the drawings.

DETAILED DESCRIPTION OF THE INVENTION

Figure 1:
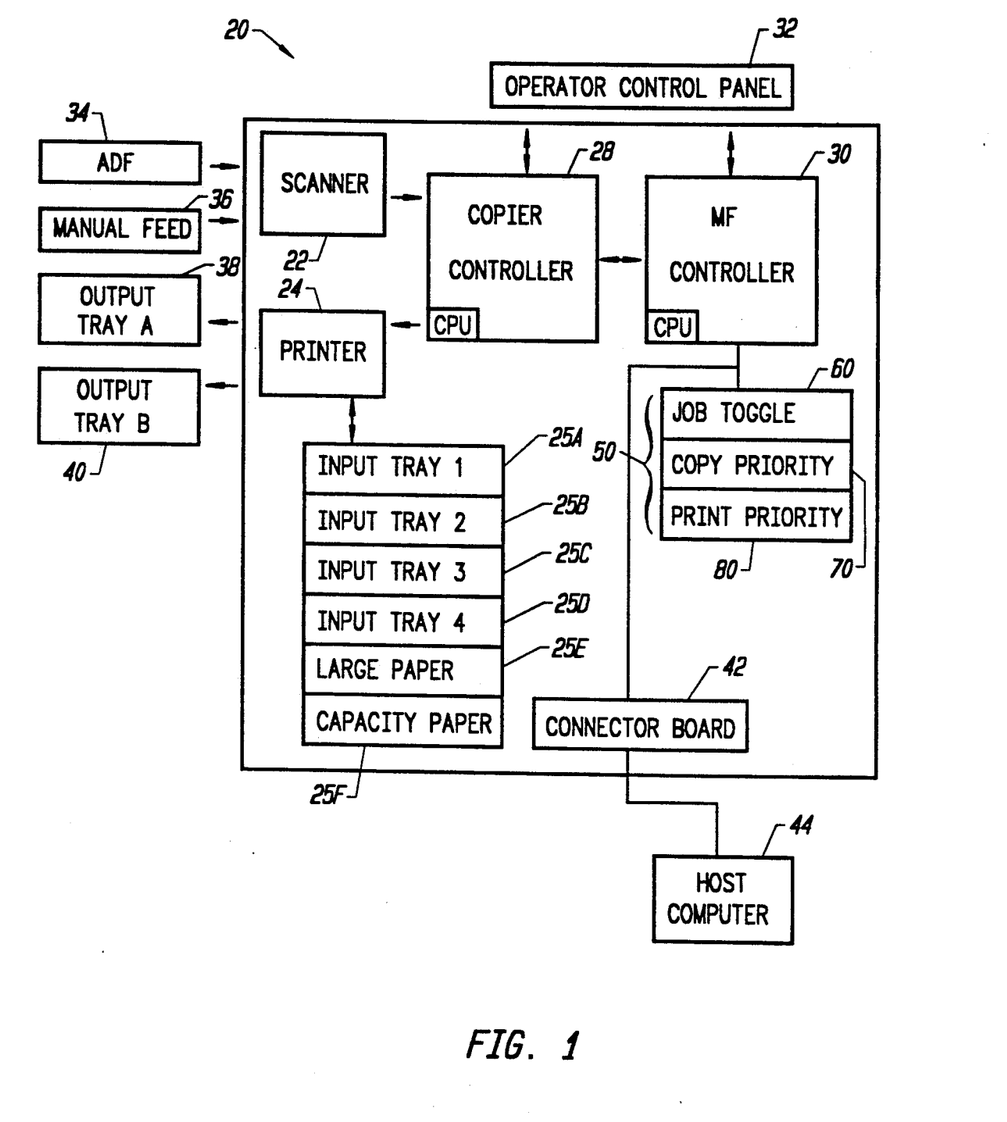
FIG. 1 is a generalized depiction of a multi-function machine which may be used in accordance with the present invention.

Referring to FIG. 1, a multi-function machine 20 is disclosed which may be used in accordance with the present invention. The multi-function machine 20 includes a scanner 22 and a printer 24. Scanner 22 includes a CCD which is utilized to realize digital copying of documents. Preferably, a copier controller board 28 is used which includes a CPU. In addition, a multi-function controller 30 may be provided which includes a CPU. The multi-function controller 30 may be used to provide interleaving and page rasterizing, as to be more fully described below. The copier controller 28 may be used for low level control of the scanner and printer.

These elements are coupled to an operator control panel 32. The operator control panel 32 includes a number of buttons and LED indicators to enter parameters and execute operations for the printer and scanner functions.

The multi-function machine also includes an automatic document feeder (ADF) 34 and an input for a manual feed 36. These elements are coupled to the scanner 22. The printer 24 is coupled to a plurality of input trays 25A-25F, a first output tray 38, and a second output tray 40. A connector board 42 is coupled to the multi-function controller 30 and is also coupled to a host computer 44. Connector board 42 may be a RS232 serial port, a bi-directional Centronics compatible parallel port, a SCSI port and/or an Apple Talk compatible RS422 port. Host computer 44 downloads print jobs through connector board 42. The print jobs are then rasterized by the multi-function controller 30 and the raster image is then transferred to the printer 24.

Multi-function machines are known in the art. In particular, machines with printer and scanner functions are disclosed in U.S. Pat. Nos. 4,947,345 (the '345 patent) and 4,910,607 (the '607 patent), these patents are expressly incorporated by reference herein.

The '345 patent discloses a multi-function machine with a priority scheme. However, the priority scheme in the '345 patent does not account for the set-up times associated with various jobs to be performed by a multi-function machine. In addition, the '345 patent uses a restricted FIFO structure which does not intermittently make progress on a number of pending jobs. The '607 patent is limited to a strict queue operation for performing jobs. A STOP function is provided to stop an executing job in order to perform a new job. Thus, there is no interleaving of jobs to realize concurrent progress on a number of jobs.

These problems are addressed with the present invention. The multi-function machine 20 of the present invention includes a memory 50. Memory 50 may be a hard disk, RAM, ROM, or some other storage device. Memory 50 includes a number of programs. These programs include job toggle 60, copy priority 70, and print priority 80. The programs work in conjunction with multi-function controller 30 and other elements of the multi-function machine 20 to provide an interleaving of requested tasks.

In particular, the control programs of the present invention provide for an interleaving of jobs so that progress on a number of jobs can be made simultaneously. This feature is obtained in part by utilizing the output aspects of the machine while the machine is preparing to execute a job.

As discussed in the background section, a print job requires a set-up time for rasterizing a page to be printed. Similarly, a copy job requires a set-up time as the automatic document feed, or a user utilizing the manual feed 36, positions a document for copying. During any set-up period, control of the machine is transferred so that an output function can be realized during the set-up period.

For example, if a page is being rasterized, but a document has already been fed through the ADF 34, then a copy is made during the rasterizing set-up period. Conversely, if a page to be printed has already been rasterized, and the ADF 34 has not fed a document to the copier, then a page is printed during the ADF set-up period.

As a result, an output function is realized during all set-up periods. Consequently, the multi-function machine 20 is being used more efficiently. In addition, progress is made on a number of jobs, thereby preventing a single job from preventing progress on other jobs.

Figure 2:
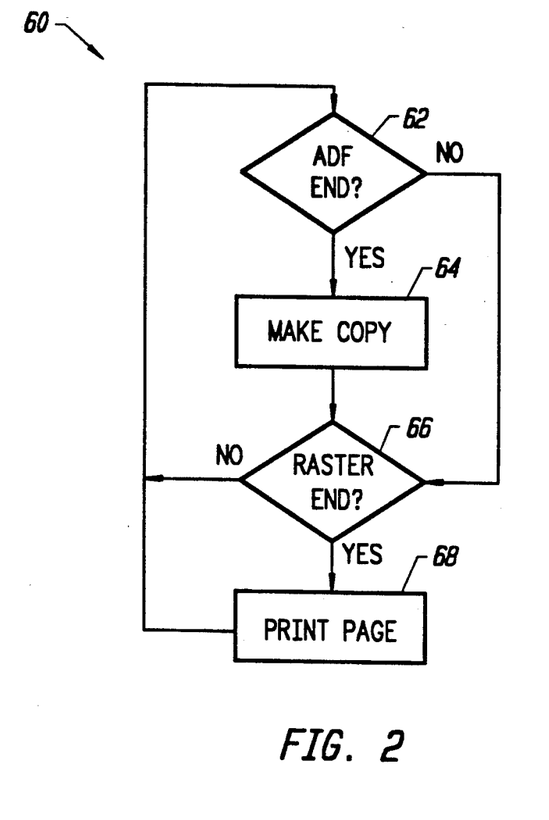
FIG. 2 is a block diagram of a sequential control scheme for the job toggle mode of the present invention.

The operation of the present invention is more fully disclosed in relation to FIG. 2. FIG. 2 is a block diagram of a sequential control scheme for a job toggle mode 60 of the present invention. By way of overview, in this mode, control is transferred between the printer function and the copying function to determine whether a job is ready for execution. Control toggles between the two functions throughout the operational period.

Initially, a determination is made as to whether the ADF has loaded a document for copying (block 62). If the ADF function is completed, that fact indicates that a document is ready to be copied and a copy is made of the document (block 64).

If the ADF function is not completed (block 62—no decision) or if the copy page function is completed (block 64), a decision is made as to whether a page has been rasterized (block 66). If a page has been rasterized, that fact indicates that a page is ready to be printed, therefore a control signal is provided to print a page (block 68). After a page has been printed (block 68) and when rasterizing is not complete (block 66—no decision), a decision is made as to whether the ADF function is complete (block 62).

The job toggle mode 60 provides constant interchange between functional resources. The functional resources, the scanner 22 and printer 24, interchangeably perform their jobs. Each job may be viewed as consisting of a number of tasks. For instance, a copying job may require making 8 copies of 4 documents, thus this copy job will consist of 32 tasks (8 copies ×4 documents). A printing job may require making 3 copies of a 2 page document, thus the printing job will consist of 6 tasks (3 copies ×2 pages). In the hypothetical copying job, the ADF will be loaded 4 times. Thus, there will be 4 set-up periods associated with the copying job. In the hypothetical printing job, 2 pages will need to be rasterized. Thus, there will be 2 set-up periods associated with the printing job.

In the job toggle embodiment of FIG. 2, control is transferred between the copying and printing jobs as long as the ADF loading and rasterizing is completed. As a result, any two existing jobs will be completed without priority over the other job.

In accordance with the present invention, a priority scheme may be utilized on the multi-function machine 20. In particular, FIG. 3 discloses a copy priority scheme 70. By way of overview, the copy priority scheme 70 will make all necessary copies after a document is positioned by the ADF. When it is necessary for the ADF to position another document, an inquiry is made to determine whether a rasterized page is ready to be printed. If a rasterized page is ready, then the page is printed while the ADF is reloading another document.

Figure 3:
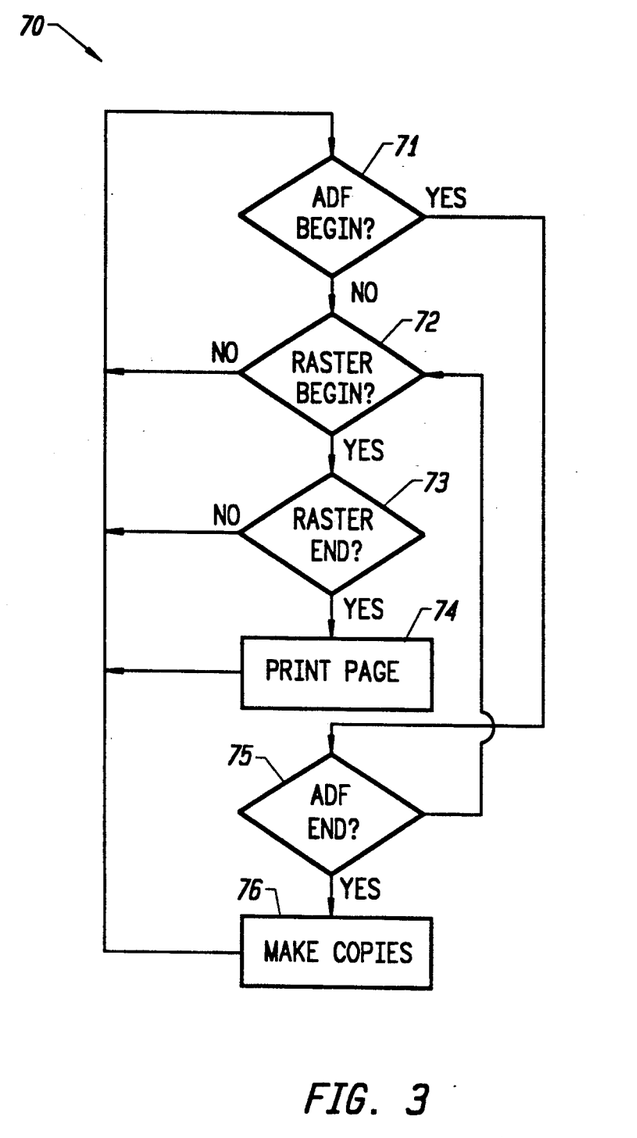
FIG. 3 is a block diagram of a sequential control scheme for the copy priority mode of the present invention.

The copy priority scheme 70 begins by determining whether the ADF function has been initiated (block 71). If the ADF function has been initiated, then, a decision is made as to whether it is completed (block 75). If the ADF function is completed, then copies are made (block 76). For instance, using the example previously cited, if the first of 4 documents to be copied is loaded by the ADF, then 8 copies are made of the document.

Returning to block 71, if the ADF function has not been begun, then a decision is made as to whether rasterization has begun on a page to be printed (block 72). If rasterization of a page has begun, a decision is made as to whether the rasterization is complete (block 73). If the answer is "no" to either block 72 or block 73, then control returns to decision block 71. If rasterization is complete (decision block 74), then a single page is printed (block 74). Again, using the example previously cited, after the first document loaded by the ADF has been copied 8 times, the ADF is re-initiated to load the next document. If the ADF function is not completed (block 75), control is transferred to block 72 to determine whether rasterization of the first page of the print job has begun. If the rasterization step has begun, a decision is made (block 73) as to whether the rasterization step is completed. If the rasterization is completed, then at least one print task is completed; that is, one page of the required 3 pages of the first page of the 2 page document is printed.

In sum, it can be seen that the copy priority mode 70 will make all required copies once a document is properly positioned, but will allow a print job to be printed during the ADF loading time, if the print job is ready to be printed. Therefore, copy jobs enjoy a clear priority and will be completed prior to print jobs, but print jobs will still have an opportunity to progress.

Figure 4:
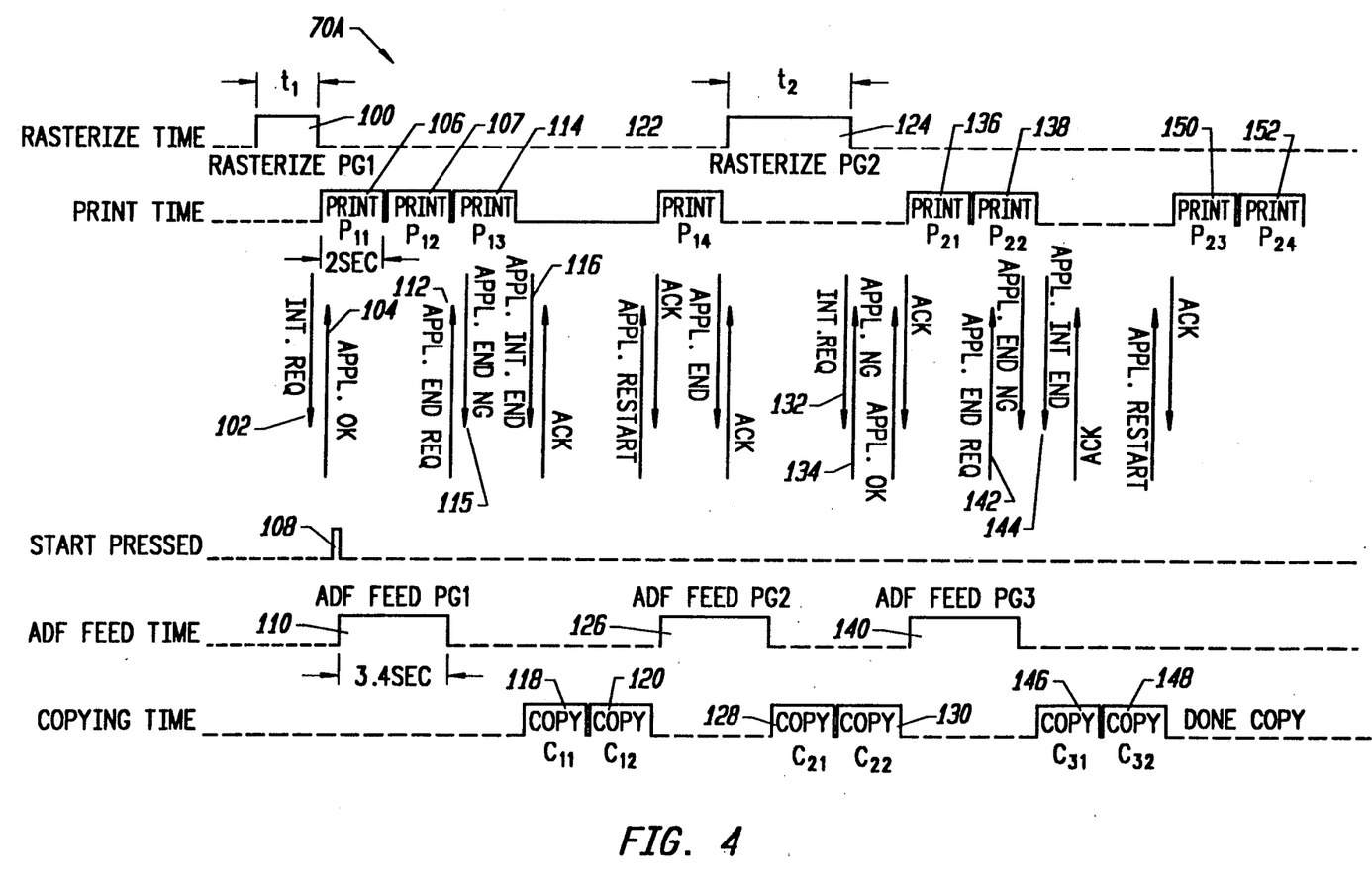
FIG. 4 is a timing diagram for an interrupt driven embodiment of the copy priority mode.

An alternate embodiment of the copy priority mode 70 is depicted in FIG. 4. In particular, FIG. 4 depicts a timing diagram for an interrupt driven copy priority mode 70A embodiment of the present invention. In this example, a two page document is printed, with each page of the document being printed 4 times; in addition, a 3 page document is copied, with each page of the document being copied two times.

Beginning in the upper left-hand corner, the first page of a four page printing job is rasterized (signal 100). An inquiry is made as to whether a copying job is in progress (interrupt request arrow 102). Since no copying job is running, a signal is sent back (application OK arrow 104) which allows the low priority printing job to commence (signal 106).

Subsequently, the start button for a copy job is pressed (signal 108) and the ADF is initiated (signal 110). After the ADF positions the document for copying, a signal (application end request arrow 112) is sent to override the printing function. Since the current page is in progress (signal 114), printing is completed, while the copy job request is turned down (application end no good arrow 115). After the page is completed, a signal is sent (application end arrow 116) and the copying job is initiated. In particular, two copies are made of the one document positioned by the ADF (signals 118 and 120).

At this point, since the ADF has not positioned the second document to be copied, the fourth page of the print job is printed (signal 122). After completion of the printing of the fourth page, rasterization of the second page beings (signal 124). During this rasterization period, the ADF for the second document is completed (signal 126). Two copies of the document are made (signals 128 and 130).

During the copying of the documents, rasterization is completed, and an interruption request (arrow 132) is made. Since the machine is operating in the copy priority mode, the request is rejected (arrow 134). However, the requested job is printed (signals 136 and 138) when the ADF is again initiated (signal 140). When the ADF is completed, a request is made to override the printing job (arrow 142). After the current page of the printing job is completed a signal is sent (arrow 144) which allows for two copies to be made (signals 146 and 148) of the third and final document. Thus, after the copy job is completed (2 copies have been made of each of the three pages), then the remainder of the print job may be completed (signals 150 and 152).

The example of FIG. 4 demonstrates the considerable benefits associated with the present invention. In particular, 6 pages (106, 107, 114, 122, 136, 138) were printed during the ADF time (110, 126, 140) associated with the copying job. As a result, the printing job was completed more expeditiously while the copying job experienced only a slightly longer execution time. In addition, two copies (128, 130) were made during the second rasterization period (signal 124). In sum, the interleaving of jobs substantially enhances the operation of the multi-function machine 20.

The multi-function machine 20 of the present invention may also be operated in a print priority mode 80. The print priority mode 80 is more fully disclosed in relation to FIG. 5. The print priority mode operates analogously to the copy priority mode 70, with the print jobs having priority.

Figure 5:
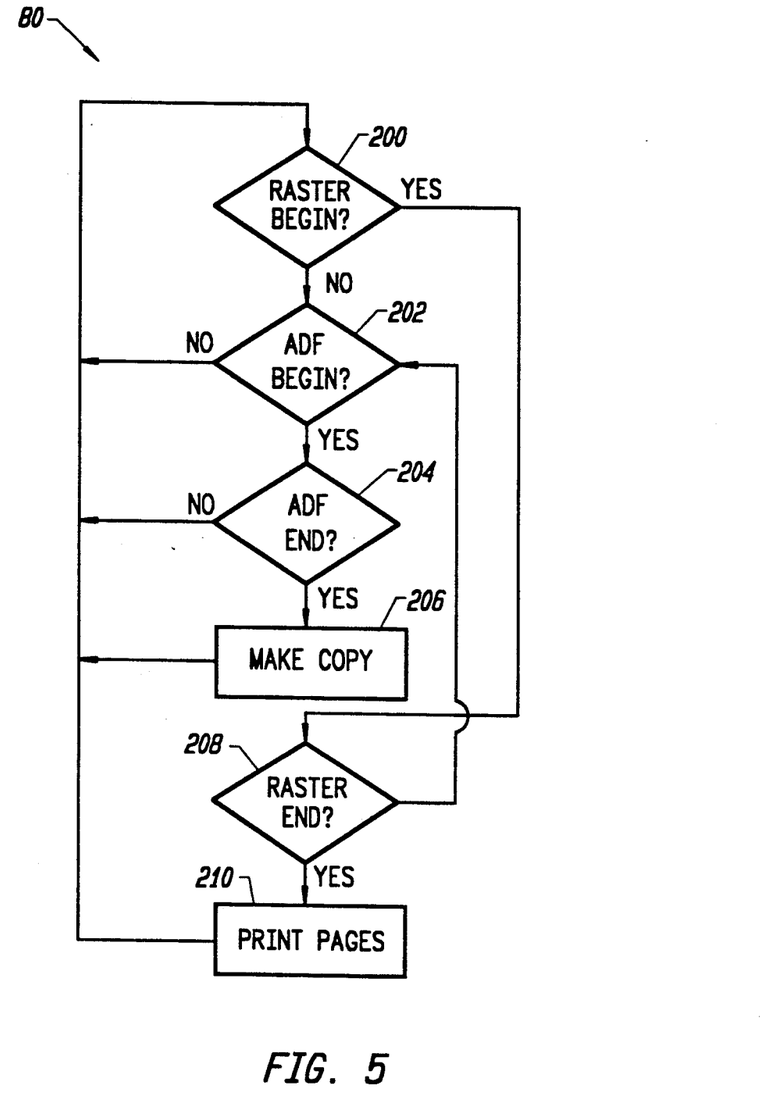
FIG. 5 is a block diagram of a sequential control scheme for the print priority mode of the present invention.

An initial determination is made as to whether rasterization has begun (block 200). If rasterization has begun, a determination is made as to whether rasterization is completed (block 208). If rasterization is completed, all prints required for the rasterized page are made (block 210).

If rasterization of a document has not begun or has not been completed, then a determination is made as to whether an ADF function has been initiated (block 202). If the ADF function is completed (block 204), then a single copy of the loaded document is made (block 206). After making a copy (block 206) or if the ADF process is not complete (blocks 202 and 204), then the rasterization process is checked once again (block 200).

Figure 6:
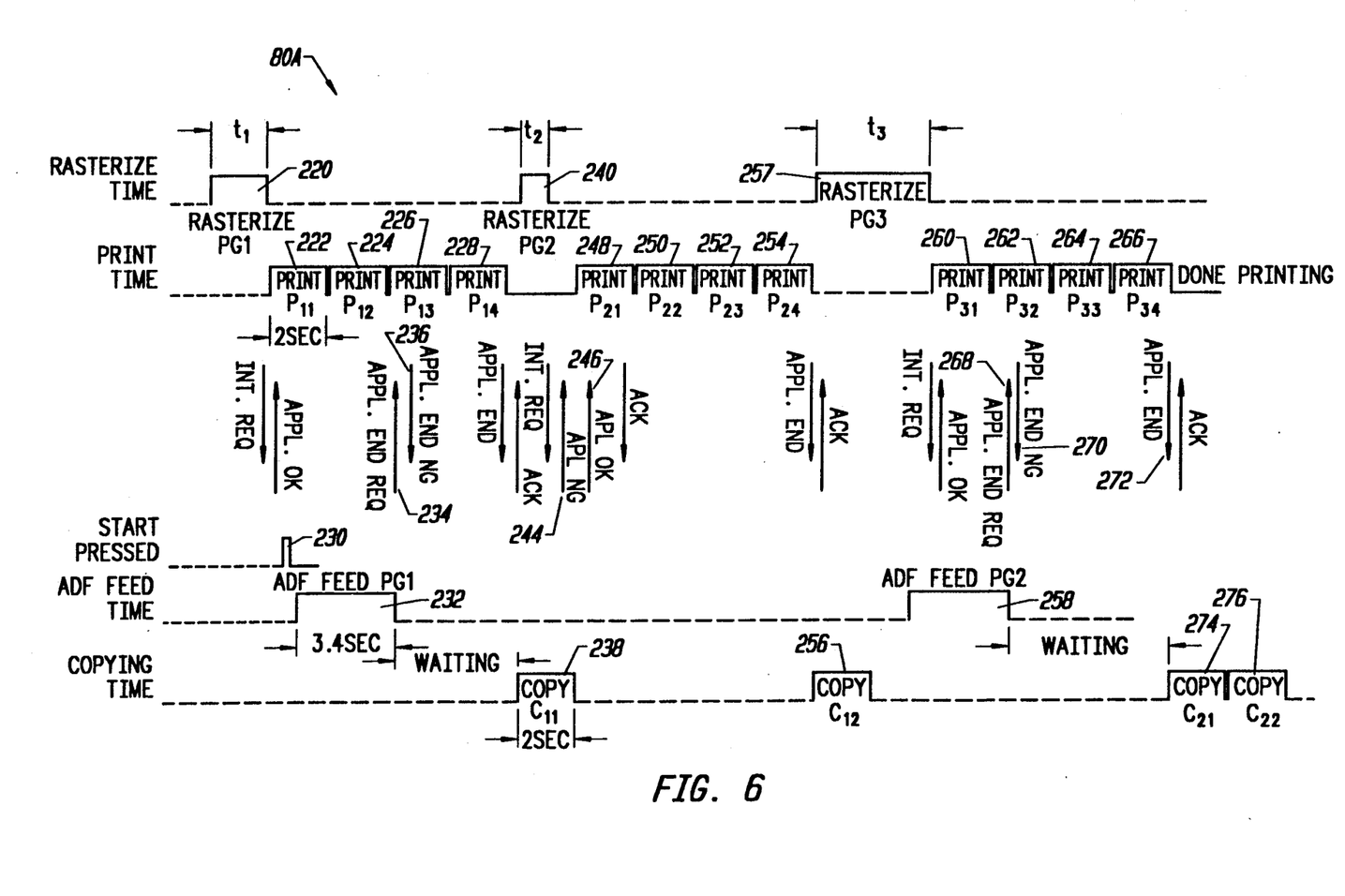
FIG. 6 is a timing diagram for an interrupt driven embodiment of the print priority mode.

An interrupt driven embodiment of print priority mode is disclosed in relation to FIG. 6. In this example, 4 pages are printed of a 3 page document and 2 copies are made of a 2 page document. Rasterization (signal 220) for the first page of the document is initiated and then 4 pages of the first page of the document are printed (signals 222, 224, 226, 228). During the printing process, a copy is requested (signal 230) and the ADF function is initiated (signal 232). At the end of the ADF function, a signal is sent to interrupt the printing (application end request arrow 234). The low priority copy job request is turned down (application end no good arrow 236). When the high priority printing job is completed, the requested copy job begins (signal 238).

When the rasterization (signal 240) of the second page of the document to be printed is completed, a request is sent to interrupt the copy job (interrupt request arrow 242). The request is initially turned down (application no good arrow 244) because a copy job (signal 238) is in progress. Once the first of the two pages to be copied is completed, an interrupt for printing is allowed (application OK arrow 246) Subsequently, 4 pages (signals 248, 250, 252, 254) are made of the second page of the document. Only after these pages are printed is the second copy of the first document (signal 256) enabled.

The third page of the document to be printed is rasterized (signal 257) during the printing of the second copy (signal 256). After the rasterization is concluded, printing of the document is completed (signals 260, 262, 264, 266). Although the ADF job (signal 258) is completed during the printing job, the request to interrupt the printing job (application end request arrow 268) is turned down (application end no good arrow 270). The completion of the copy job is not realized until a signal is provided at the termination of the printing job (application end arrow 272). At that time, the final two copies are made (signals 274, 276).

As in the copy priority mode, the print priority mode achieves a successful interleaving of jobs. Two copies are made (238, 256) during the rasterization (240, 257) of pages. Thus, the multi-function machine 20 operates more efficiently as progress is intermittently made on a number of jobs.

Preferably, at least two output trays (38, 40) are provided to segregate the different jobs. An interrupted or waiting print job may be stored in memory 50 or in host computer 44, as directed by multi-function controller 30. The mode of operation may be selected from either the operator control panel 32 or the host computer 44.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A multi-function machine with interleaved job execution, comprising:
    a first functional element for executing a plurality of first priority jobs, said first functional element requiring a first set-up period prior to executing one of said first priority jobs;
    a second functional element for executing a plurality of second priority jobs, said second functional element requiring a second set-up period prior to executing one of said second priority jobs, each of said second priority jobs including one or more tasks;
    a shared physical resource utilized by said first functional element for executing said plurality of first priority jobs and said second functional element for executing said plurality of second priority jobs;
    means for operating said first functional element to execute said plurality of first priority jobs;
    means for automatically interrupting said operating means during said first set-up period when said second set-up period is complete; and
    means for automatically executing one or more of said tasks on said second functional element in response to said interrupting means so as to exploit said shared physical resource during said first set-up period and thereby interleave the execution of said second priority jobs with the execution of said first priority jobs.

2. The apparatus of claim 1 wherein said first functional element is a digital copier and said first set-up period is the time required for a document to be properly positioned for copying.

3. The apparatus of claim 2 wherein said second functional element is a printer and said second set-up period is the time required for a page to be rasterized.

4. The apparatus of claim 1 wherein said first functional element is a printer and said first set-up period is the time required for a page to be rasterized.

5. The apparatus of claim 4 wherein said second functional element is a digital copier and said second set-up period is the time required for a document to be properly positioned for copying.

6. A multi-function machine with interleaved job execution, comprising:
    a printer for executing a print job including a plurality of pages to be printed, each of said pages requiring a print set-up period to rasterize the page to be printed;
    a digital copier for executing a copy job including a plurality of documents to be copied, each of said documents requiring a copy set-up period to mechanically position the document to be copied;
    a shared physical resource utilized by said printer for executing said print job and said digital copier for executing said copy job;
    means for automatically interrupting the execution of said print job during said print set-up period when said copy set-up period is completed;
    means for automatically executing said copy job until said print set-up period is complete and thereby utilize said shared physical resource to interleave the execution of said copy job with the execution of said print job; and
    means for automatically returning control to said printer to complete said print job.

7. A multi-function machine with interleaved job execution, comprising:
    a digital copier for executing a copy job including a plurality of documents to be copied, each of said documents requiring a copy set-up period to mechanically position the document to be copied;
    a printer for executing a print job including a plurality of pages to be printed, each of said pages requiring a print set-up period to rasterize the page to be printed;
    a shared physical resource utilized by said copier for executing said copy job and said printer for executing said print job;
    means for automatically interrupting the execution of said copy job during said copy set-up period when said print set-up period is completed;
    means for automatically executing said print job until said copy set-up period is complete and thereby utilize said shared physical resource to interleave the execution of said print job with the execution of said copy job; and
    means for automatically returning control to said copier to complete said copy job.

8. A method of operating a machine with multiple functional elements that share a common operative resource, said machine including a first functional element for executing a plurality of first priority jobs, each of said first priority jobs including a first set-up period prior to execution, and a second functional element for executing a plurality of second priority jobs, each of said second priority jobs including a second set-up period prior to execution, said method comprising the steps of:
    operating said first functional element to execute said plurality of first priority jobs;
    automatically interrupting execution of said plurality of first priority jobs during said first set-up period when said second set-up period is complete; and automatically executing one or more of said second priority jobs on said second functional element in response to said interrupting step so as to utilize said common operative resource and thereby interleave the execution of said second priority jobs with the execution of said first priority jobs.

9. The method of claim 8 further comprising the step of running said second priority jobs on said second functional element when all of said first priority jobs are complete.

10. The method of claim 8 wherein said operating step includes digital copying of a document.

11. The method of claim 10 wherein said executing step includes printing a page.

12. The method of claim 8 wherein said operating step includes printing a page.

13. The method of claim 12 wherein said executing step includes digital copying of a document.

* * * * *